United States Patent
Bornhauser et al.

[11] Patent Number: 6,037,881
[45] Date of Patent: Mar. 14, 2000

[54] VEHICLE-LOCATING METHOD AND DEVICE

[75] Inventors: Hans-Peter Bornhauser, Weinfelden; Ernst Fitze, Wilen Gottshaus; Andreas Gfeller, Rumlang, all of Switzerland

[73] Assignee: Hani-Prolectronh AG, Bronschhofen, Switzerland

[21] Appl. No.: 09/068,993

[22] PCT Filed: Nov. 27, 1996

[86] PCT No.: PCT/CH96/00419

§ 371 Date: May 27, 1998

§ 102(e) Date: May 27, 1998

[87] PCT Pub. No.: WO97/20190

PCT Pub. Date: Jun. 5, 1997

[30] Foreign Application Priority Data

Nov. 29, 1995 [CH] Switzerland .............................. 3385/95

[51] Int. Cl.[7] .................................................. G08G 1/123
[52] U.S. Cl. .......................... 340/994; 340/906; 340/988; 340/928; 701/217; 701/220
[58] Field of Search ..................... 340/994, 906, 340/988, 907, 905, 928; 701/217, 20, 220, 117, 207; 342/357.07; 246/124; 455/66

[56] References Cited

U.S. PATENT DOCUMENTS

| | | | |
|---|---|---|---|
| 3,886,515 | 5/1975 | Cottin et al. | 340/994 |
| 4,307,859 | 12/1981 | Hayashi et al. | 246/124 |
| 4,799,162 | 1/1989 | Shinkawa et al. | 701/117 |
| 5,345,232 | 9/1994 | Robertson | 340/906 |
| 5,440,489 | 8/1995 | Newman | 701/20 |
| 5,493,295 | 2/1996 | Lewiner et al. | 340/994 |
| 5,541,845 | 7/1996 | Klein | 701/207 |
| 5,554,982 | 9/1996 | Shirkey et al. | 340/903 |
| 5,613,216 | 3/1997 | Galler | 455/66 |
| 5,657,010 | 8/1997 | Jones | 340/994 |
| 5,717,389 | 2/1998 | Mertens et al. | 340/928 |
| 5,736,940 | 4/1998 | Burgener | 340/994 |
| 5,751,245 | 5/1998 | Janky et al. | 342/357.07 |

FOREIGN PATENT DOCUMENTS

| | | |
|---|---|---|
| 2466815 | 4/1981 | France . |
| 3326539 | 1/1984 | Germany . |
| 1217599 | 8/1989 | Japan . |
| 2130374 | 5/1984 | United Kingdom . |

OTHER PUBLICATIONS

Gehrig, "Moderne Betriebsleitsysteme auf Basis von Datenfunknetzen," *Verkehr und Technik*, issue 12, pp. 495–501 (1992).

Patent Abstracts of Japan, vol. 13, No. 530 (P–966) (Nov. 1989).

*Primary Examiner*—Benjamin C. Lee
*Attorney, Agent, or Firm*—Greenblum & Bernstein, P.L.C.

[57] ABSTRACT

The method and device serve to continuously locate vehicles (LB) which contain a computer (IR) connected to a path data measuring unit which emits a measured value corresponding to the distance covered. The computer (IR) is further connected to a path data memory (CD) in which the route network to be traveled, the target stopping positions s of bus stops (H) with their mutual distances D and the stopping ranges d associated with the stops (H) are stored. On the basis of the data stored and at least one accuracy factor g corresponding to the path length measurement, the computer (IR) establishes the capture range $f_y$ of a stop ($H_y$) on the traffic path and corrects the measured value w as soon as the vehicle (LB) stops and the measured value w lies in the dynamically determined capture range $f_y$.

13 Claims, 4 Drawing Sheets

Fig. 6

VEHICLE-LOCATING METHOD AND DEVICE

CROSS-REFERENCE TO RELATED APPLICATIONS

The present application is a U.S. National Stage application of International application No. PCT/CH96/00419 filed Nov. 27, 1996, which claims priority of Swiss Patent Application No. 3385/95, filed on Nov. 29, 1995.

BACKGROUND OF THE INVENTION

1. Field of the Invention

The present invention relates to a method and device for continuously locating vehicles. A computer is connected to a path data measuring unit that emits a measured value w corresponding to a distance covered. The computer is further connected to a path data memory, in which the route to be traveled, the position of bus stops, and the distances between stops are stored.

In order to guarantee a smooth functioning of medium-sized and large traffic operations, in particular in local public transportation (ÖPNV), modem computer-controlled operational control systems (RBL) are used, as described in "Modem Operational Control Systems on the Basis of Data Radio Networks," by Dr. J. Gehrig in "Verkehr und Technik," special edition, Issue 12, Erich Schmidt Verlag, Berlin, 1992. The communication between the system units of a modem operational control system shown in FIG. 1: the control headquarters (LST), the vehicles LB as well as local control devices, for example for influencing traffic signals LSA, which control the flow of traffic, normally takes place via radio in real time. The transfer of data from point to point, for example from stationary points along the route to the vehicles LB, often takes place via an infra-red connection. To control the peripheral system units LB, LSA, XP, XT and for the cyclical collection of the immediate operating data, digital telegrams are used, which are transformed into analogue signals (modulation)and broadcast over at least one data channel. To optimize the functions within the control system, relevant local specific information is called up and analyzed, preferably by the control headquarters LST. Knowledge of the exact position of each vehicle LB is of importance not only for the control headquarters LST, but also for the computer systems placed in the vehicles LB. A locating system which delivers precise data concerning the location of the vehicle LB is the prerequisite for a specific local delivery of information about passengers, the control of traffic signals LSA, as well as the calculation of schedule deviations. For instance, if two public buses (for example LB30 and LB299) are approaching an intersection, a computer positioned at that intersection, which determines which bus LB would reach the intersection first, could control the traffic signal LSA in such a way that both buses LB30 and LB299 can cross the intersection with as little delay as possible. Further, the vehicle position could be used as an input quantity for controlling the ticket machines in the individual vehicles LB.

By means of satellites or beacons, the position of a vehicle LB can be ascertained in a known fashion with minimal error deviations. These locating systems are, however, expensive and do not always satisfy the requirements placed on them. For example, the radio connection between moving vehicles LB to the satellite can occasionally be interrupted. Beacons, which would have to be present in large numbers, can only deliver exact position data at certain points.

Figure 2:
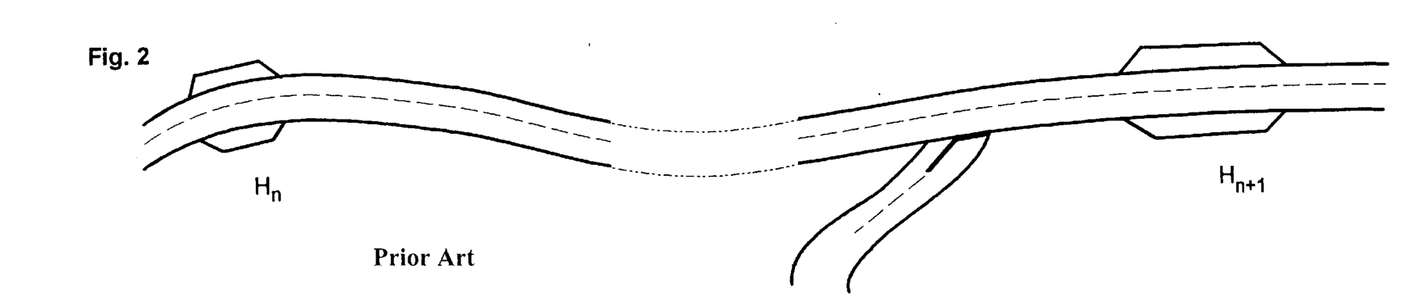
FIG. 2 a section of a route network
Figure 3:
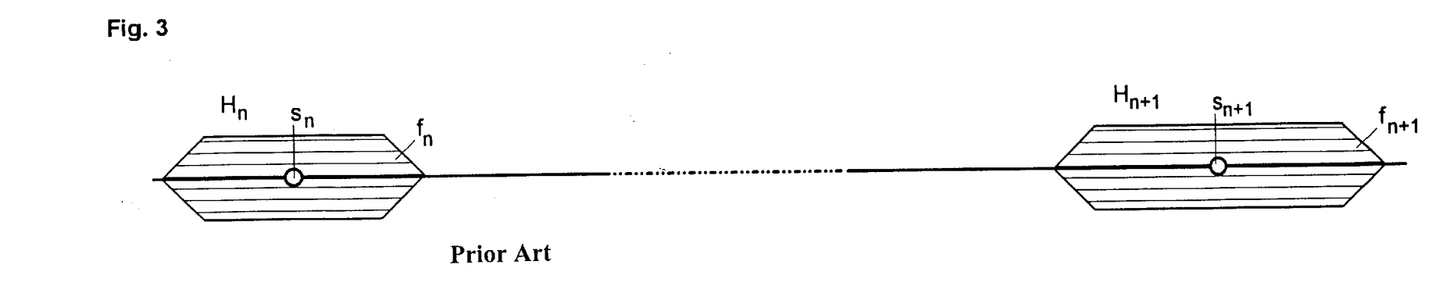
FIG. 3 data, containing maximum values for the capture ranges, stored in the memory of a vehicle traveling on the route network in accordance with FIG. 2

Further, a device is known by which measured path data are corrected by means of data corresponding to a street map in a manner described in the following. The determination of the distance traveled takes place by means of an on-board computer, preferably by measuring the revolutions of a wheel with a known diameter. Over longer distances, greater deviations between the distance measured and the distance actually traveled can arise due to indications of slippage, changes in wheel diameter, or through veering or passing maneuvers. Therefore, the measured distance must be corrected regularly. For this purpose, as shown in FIGS. 2 and 3, each bus stop H is, in the data memory, assigned a target stopping position s as well as a maximal capture range f. Each maximal capture range f is chosen such that due to it, the measured value w of the path route traveled, with consideration of the possible occurrence of measuring error e, is always taken when the vehicle LB stops at the relevant bus stop H. If the vehicle LB stops within the capture range f, this is registered by the on-board computer as a stop at a defined bus stop H. The measured value w, which can be taken, for example, from the front of the vehicle LB can thus be compared with the position data in memory storage of the corresponding target stopping positions s. In order that the error deviation of the measured value w do not become too large, and even at the next bus stop H are still within the capture range f, when the vehicle LB is in the stopping range d, each stop at a bus stop H is used to make a correction to measured value w. This is based on the vehicle always stopping near the target stopping range s. It is thereby assumed that the deviation of measured value w from the target stopping position s has to do primarily with a faulty measurement, and that the actual position of the vehicle lies approximately in between measured value w and the target stop position s. Measured value w is thus corrected by half the difference between measured value w and the distance value of target stop positions.

Figure 4:
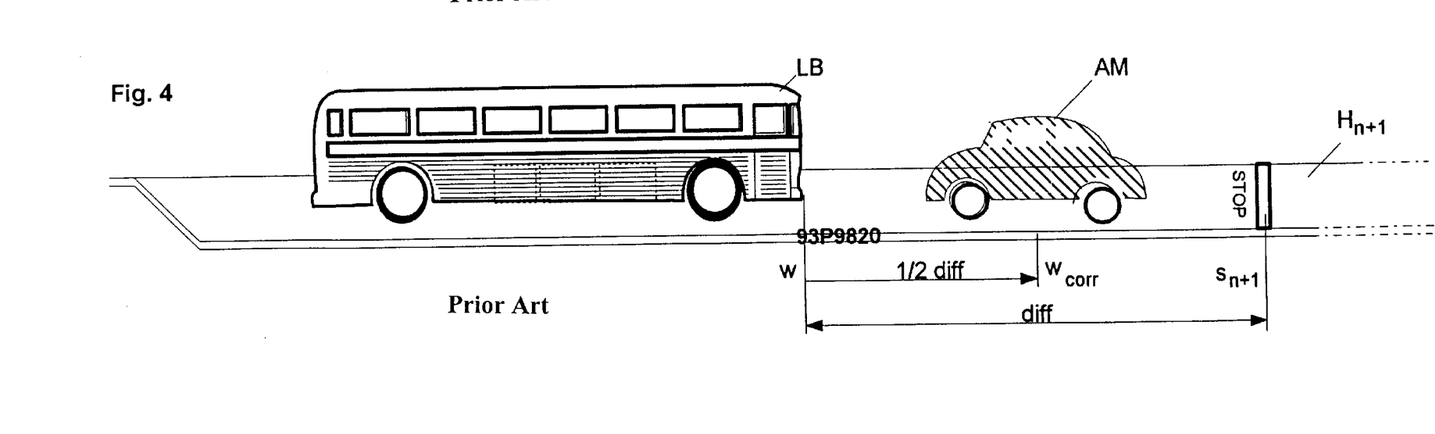
FIG. 4 a traffic situation possibly arising at a bus stop.

This method, by which the maximum area of capture range f is determined statically, exhibits considerable disadvantages. Capture range f is exclusively dependent on the distance which was covered from the place where the measured value was most recently corrected. If a correction was, for instance, made by a beacon directly before a bus stop H, a very small capture range f results up until this stop H, which can easily be missed, if the vehicle LB does not stop near the target stopping position s. The vehicle computer IR will not recognize a stop at the bus stop H in this case, and it must therefore be entered manually by the driver. The automatic delivery of information relevant to a particular bus stop, for example regarding connections, does not take place. In addition, at bus stops (for example FIG. 2 and FIG. 4, stop $H_{n+1}$) which have a greater length, serious errors arise when correcting the measured value w. In bus stop $H_{n+1}$, shown in more detail in FIG. 4, a vehicle AM is parked in such a way that vehicle LB can not drive up to the target stopping position $S_{n+1}$. The capture range f can thus be very easily missed, as described above. However, if the on-board computer IR in vehicle LB determines that the stop occurred within the capture range f, this will be registered as a stop at bus stop $H_{n+1}$. Although the vehicle LB did not drive up to target stopping position s and measured value w gives the actual position of the vehicle LB precisely, the computer IR assumes that the vehicle LB did stop precisely at the target stopping point $S_{n+1}$. The measured value w is thus corrected by half diff/2 of the difference diff between the measured value w and the distance value of the target stopping position $S_{n+1}$. Since the measured value w was originally correct, an error is introduced, which corresponds to the value diff/2, through this intended correction at the bus stop $H_{n+1}$. If the next bus stop H is not far away, and due to the short distance only a small capture range f results, this faulty correction of measured value w will lead with great probability to capture range f being missed. The measured value w, which was inexactly corrected by means of the known method, thus usually exhibits considerable deviations in regard to the actual position of the vehicle LB. Correspondingly, it is not possible to control, for example, the ticket machines exactly, so that a correct calculation of the travel costs cannot be guaranteed. The appearance of errors in measurement also make themselves disturbingly known in the control of traffic or by the delivery of information in connection with the position. For instance, traffic signals are changed too early or too late, or specific local information will not be delivered on time to the passengers in the vehicle LB. Bus stops H will often be detected only when the capture ranges f have taken on maximum values. Thus the number of faulty detections steadily increases wherein the vehicle LB stops within a capture range f, not, however, within the corresponding stopping range d of a bus stop H, by which the correction method mentioned above functions.

Disadvantages to the known method also ensue if the route network is altered even slightly. The maximum values of the capture ranges f of bus stops H must be examined and re-fitted at considerable expense.

SUMMARY OF THE INVENTION

The task of the present invention is thus to present a method as well as a device through which the position of vehicles equipped with a path data memory and a path data measuring unit can be more precisely determined. Capture ranges should be chosen in such a way that they are as small as possible yet not missed.

The method of the present invention provides assigning bus stops stopping ranges, which are one of stored in path data memory and determined by additionally stored data associated with the bus stops, wherein the additionally stored data includes target stopping positions and the lengths of bus stops. The method further positioning the vehicle within a first stopping range of a first bus stop, measuring, with the path data measuring unit, a distance from the vehicle within the first stopping range to a bus stop within the first stopping range, and determining a capture range for a subsequent bus stop. The determining includes adding the stopping ranges for the first and the subsequent bus stops to a measuring deviation, which is determined by multiplying a distance between the first and subsequent bus stops by at least one accuracy factor corresponding to the path data measurement:

$$f_y = d_x + d_y + D^*g = d_x + d_y + e$$

If the measured value at the subsequent bus stop lies within the capture range, the computer determines that the bus stop was reached, and the measurement deviation is set back to zero. If the measured value lies outside of the stopping range for the subsequent bus stop, then the measured value is corrected in a direction of the second stopping range.

The device of the present invention provides a computer for performing the process of continuously locating vehicles.

The areas within which vehicle LB stops at the bus stops H are given consideration by the means according to the invention. Thus, a more exact correction of measured value w is attained. In particular, it will be avoided that capture ranges are inappropriately determined and thus are missed by a vehicle at a bus stop. The coinciding of capture ranges f and false detections of bus stops H will be widely avoided. Changes in the route network can be taken over by the locating system with little effort. The measured values thus taken normally exhibit a higher accuracy.

BRIEF DESCRIPTION OF THE DRAWINGS

The invention will be more closely explained by means of drawings in the following examples. They show.

DETAILED DESCRIPTION OF THE PRESENT INVENTION

Figure 1:
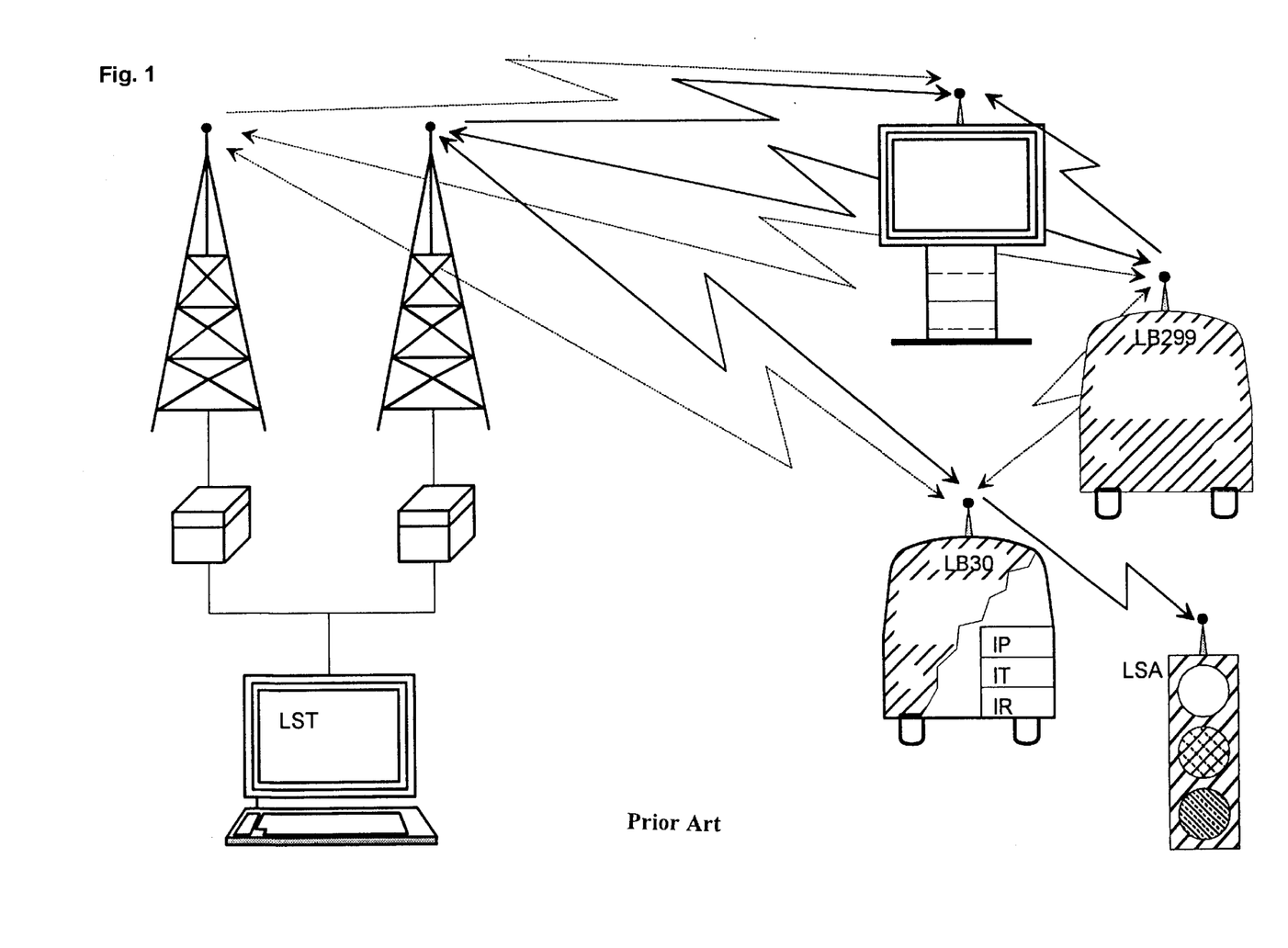
FIG. 1 a modem communications system

FIG. 1 shows, as already mentioned above, a modem operational control system which, as the central system unit, exhibits a control headquarters LST and as peripheral system units, exhibits a large number of vehicles or public buses LB as well as passenger information systems XP and ticket machines. Every vehicle LB (see FIG. 1, vehicle LB30) exhibits in addition at least one internal computer IR and preferably an internal passenger information system IP as well as an internal ticket machine IT. For the timely delivery of information, for the correct calculation of ticket prices or for the optimal control of traffic lights LSA, these units IP, IT, IR each need precise data in reference to the location of the relevant vehicle LB. The distance traveled can be only inexactly measured by means of counting the completed revolutions of a wheel with known diameter. The correction of the measured values w ascertained according to known means does not lead to satisfactory results.

In accordance with the invention, every bus stop H is assigned a stopping range d, which is taken into consideration when determining the capture range f. The capture ranges f of all bus stops H are determined individually for each approach, and the actual circumstances occurring there are measured accordingly. Thus the conditions at bus stop H which could affect the correction process are taken into account. In addition, deviations from measured value w, which normally rise proportionally to the distance covered, are also taken into account. The capture range f is thus calculated anew after the departure from a first bus stop $H_n$ for each of the next bus stops, $H_{n+1}, H_{n+2}$ ... along the route. Until stopping at a bus stop H and the correction of the measured value w completed there, the data from the first bus stop $H_n$ are thus used. The capture ranges f of further bus stops H are now calculated based on this bus stop H. The capture ranges f for bus stops H at which the vehicle LB does not stop are preferably calculated in the computer IR, so that local relevant information can be deposited correctly; a correction does not take place when the vehicle passes capture ranges f but does not stop within them. Preferably, in addition, in various vehicles LB capture ranges f are calculated from stops at which information (bus stop announcements, etc.) is to be delivered or activities (delivery of control signals to traffic lights LSA, turning on illumination before tunnels, etc.) are to be triggered.

Different data are necessary for determining the capture range f of a bus stop H. After ascertaining the driving path for the vehicle LB, it is positioned at the target stopping position s of the first bus stop H. This target stopping position s, which preferably always lies in the middle of the corresponding stopping range d, is thus the point of reference for the distance measurement and the determination of capture range f of the bus stops H along the chosen route. The stopping ranges $d_n$, $d_{n+1}$, as well as the distance D between the first and the second bus stops $H_n$, $H_{n+1}$, can now be given a read-out from the path data memory of the vehicle computer IR. Furthermore, the accuracy factor g of the path measuring device located in the vehicle LB can also be read out. Only in a preferred embodiment of the invention, the target stopping position s is stored in path data memory. The target stopping position s and the length of the bus stop could, for example, be stored instead of the stopping range d. From that, the stopping range d could be ascertained by simple calculation. In addition, the total length of the vehicle LB or a vehicle composition is preferably stored in the vehicle computer. With knowledge of the target stopping position s, the length of the bus stop and the length of the vehicle, the stopping range d can be figured even more accurately. The correction of measured value w therefore takes place with increased precision. In the following, it will be described that the measured values w are always adjusted to the end of stopping range d when a correction at a bus stop H is made, if the measured values w do not lie within the stopping range d. Through the use of a target value s, the measured value w can also be corrected, if it lies within the stopping range (for this, the measured value w is adjusted against the target stopping position s by an amount that must be determined in each case, dependent on the distance between the measured value w and the target stopping points).

In accordance with FIG. 5, the capture range $f_{n+1}$, of bus stop $H_{n+1}$, is determined as follows. If the trip of vehicle LB begins at the bus stop $H_n$ (middle of bus stop), a deviation occurs at this first bus stop Hn between the measured value w and the position for the target stopping position $S_n$ stored in memory, a maximal deviation of plus and minus half ($d_n/2$) of the stopping range $d_n$, which must be taken into account when determining the capture range $f_{n+1}$ of the next bus stop $H_{n+1}$. The capture range $f_{n+1}$ is in addition increased by the length of stopping range $d_{n+1}$, of the next bus stop $H_{n+1}$. What also must be considered is the maximum possible measurement deviation e, which can appear along the route D between the two bus stops $H_n$ and $H_{n+1}$. The capture range $f_{n+1}$ is thus calculated as follows:

$$f_{n+1}=d_n+d_{n+1}+D*g=d_n+d_{n+1}+e \qquad \text{Formula 1}$$

Figure 5:
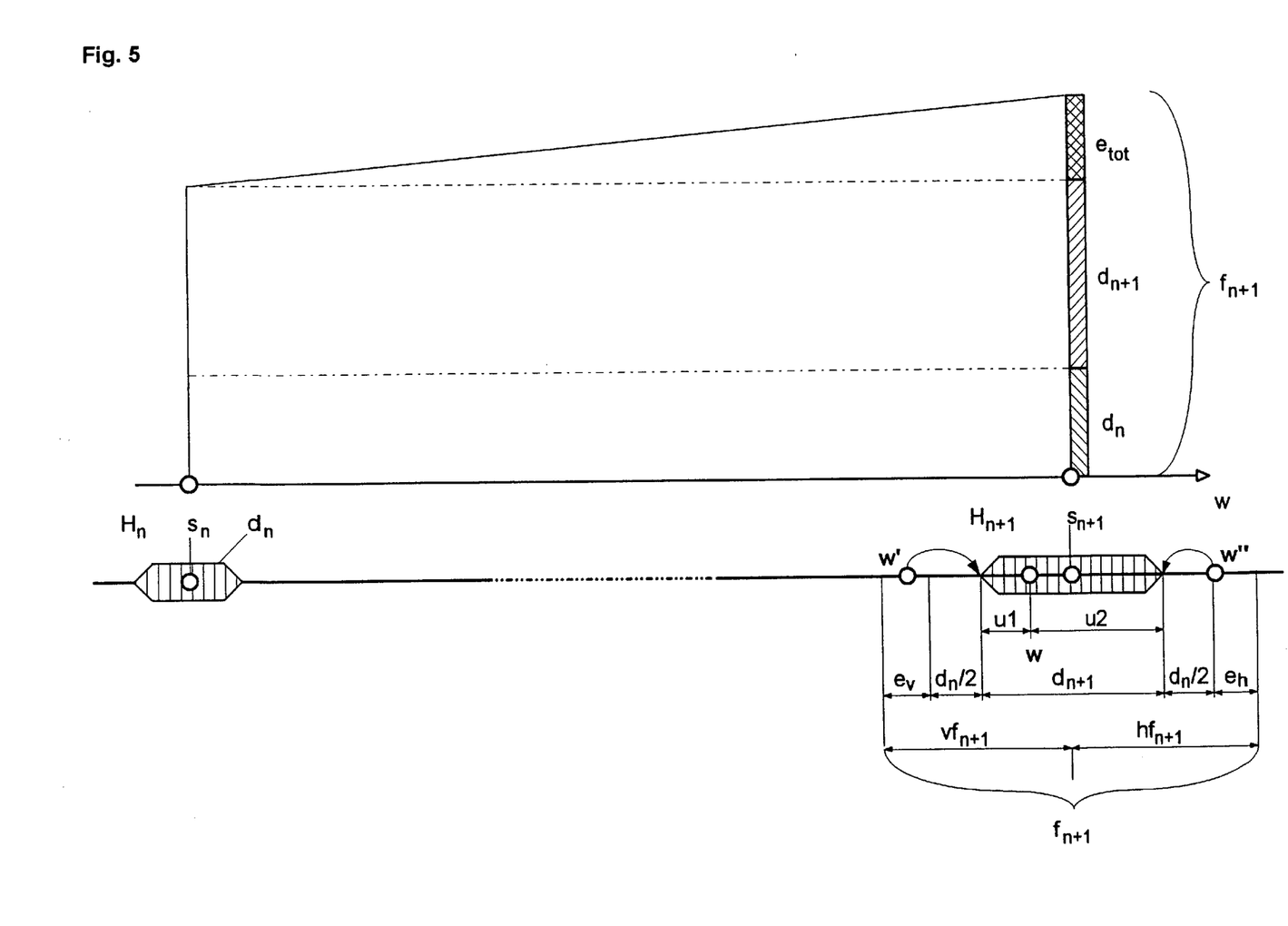
FIG. 5&6 the determination of a capture range in accordance with the invention.

The capture range $f_{n+1}$ is chosen, in accordance with FIG. 5, for example concentric to stopping range $d_{n+1}$ or, if in memory, to target stopping position $s_{n+1}$ of bus stop $H_{n+1}$. The measurement deviation e is divided in FIG. 5 into two equal route segments $e_v$ and $e_n$.

It is preferable, however, to have route segment $e_h$ be larger after target stopping position $s_{n+1}$ than route segment $e_v$ before target stopping position $s_{n+1}$, because measured value w is usually larger than the stored distance D between the relevant bus stops H. This is for instance the case when an increased wheel slippage occurs or the vehicle LB must drive around a number of construction sites. Therefore two accuracy factors $g_v$ and $g_h$ must be used, which are ascertained through experimentation. The capture range $vf_{n+1}$ before target stopping position $s_{n+1}$ is made up of the following:

$$vf_{n+1} = \frac{d_n}{2} + \frac{d_{n+1}}{2} + D*g_v = \frac{d_n}{2} + \frac{d_{n+1}}{2} + e_v \qquad \text{Formula 2}$$

The capture range $hf_{n+1}$ after the target stopping position $s_{n+1}$ is, in contrast:

$$hf_{n+1} = \frac{d_n}{2} + \frac{d_{n+1}}{2} + D*g_h = \frac{d_n}{2} + \frac{d_{n+1}}{2} + e_h \qquad \text{Formula 3}$$

After departure from bus stop $H_n$, the vehicle computer IR calculates, by means of the route network data stored in memory, the capture range $f_{n+1}$ or the partial ranges $vf_{n+1}$ and $hf_{n+1}$ of the next bus stop $H_{n+1}$. A vehicle stopping inside the zone, in which lies the measured value w of the distance already covered within capture ranges $f_{n+1}$ or within partial areas $vf_{n+1}$ and $hf_{n+1}$, is considered to be a stop at bus stop $H_{n+1}$ by the computer IR.

In order to avoid possible faulty detections, not (only) the stop within a capture range f but also the release of the vehicle door is preferably used as a criterium for detecting a bus stop H. This way, coincidental stops within a capture area f, at which the vehicle does not stop at the bus stop H or release its doors, will not be interpreted as a stop at the relevant bus stop H. If the vehicle stops outside of the capture area f, this is treated as an extraordinary stop, at which no corrections are made, just like when driving through a bus stop H. The use of the criterium "release of the vehicle door" is used instead of the criterium "opening of the vehicle door," because under certain circumstances a vehicle stops at a bus stop H without passengers getting on or off.

In case the vehicle computer IR recognizes, due to a stop and possibly the release of the vehicle door within the capture area $f_{n+1}$, that the vehicle LB is at a bus stop $H_{n+1}$, and the measured value w of the distance covered does not lie within the stopping range $d_{n+1}$, the measured value w is corrected to the closer value limit of the stopping range $d_{n+1}$. The measurement deviation e will be set back to zero after each correction of the measured value w or after every stop at a bus stop H. FIG. 5 shows this correction for possibly occurring measured values w' and w", which lie before or after the stopping range $d_{n+1}$ (the routes shown, u2 or u1, are in this case equal to zero or equal to $d_{n+1}$). If, however, the value w lies within the stopping range $d_{n+1}$, both routes u2 and u1, which divide stopping range $d_{n+1}$, are unequal to zero. A correction of measured value w is therefore unnecessary. The position of vehicle LB within stopping range $d_{n+1}$ is meaningful for the determination of capture area $f_{n+2}$ for the next bus stop $H_{n+2}$. Formulas 1 through 3 are thus only valid when the vehicle LB has departed from a starting bus stop or its target stopping position. With $H_x$ as a bus stop at which the last intermediate stop was made, and $H_y$ as a bus stop for which capture area $f_y$ is to be determined, the following formula is thus valid. The capture area $vf_y$ before the target stopping position $s_y$ is:

$$vf_y = u2_x + \frac{d_y}{2} + D*g_v = u2_x + \frac{d_y}{2} + e_v \qquad \text{Formula 4}$$

The capture range $hf_y$ after the target stopping position $s_y$ is, in contrast, $$hf_y = u1_x + \frac{d_y}{2} + D * g_h = u1_x + \frac{d_y}{2} + e_h \qquad \text{Formula 5}$$

$u1_x$ thereby corresponds to the route by which the measured value w is furthest ahead compared with the position of vehicle LB. Thus, capture range $hf_y$ after the target stopping position $s_y$ should be determined with consideration of $u1_x$. $u2_x$ corresponds to the route by which the measured value w is furthest behind compared with vehicle LB. Thus, capture range $vf_y$ before the target stopping position $s_y$ should be determined with consideration for $u2_x$.

At a stop within capture range f, the above-mentioned correction of the measured value w as well as the setting back of the measurement deviation e are effected. If numerous stops take place within capture range f, the above-mentioned correction also occurs. Normally, at the second stop, measured value w lies, as FIG. 5 shows for measured value w", behind stopping range d, but still in capture range f. The measured value w is thus ( as FIG. 5 shows for measured value w") set back to the corresponding limiting value of stopping range d.

If the vehicle LB passes a beacon, the computer IR searches for its position in the chosen route and corrects the measured value w correspondingly and resets the measurement deviation e back to zero. Due to the precisely-known initial position of vehicle LB, the capture range f can be more closely determined. Thus, the capture range $vf_y$ before the target stopping position is:

$$vf_y = \frac{d_y}{2} + D * g_v = \frac{d_y}{2} + e_v \qquad \text{Formula 6}$$

The capture range $hf_y$ after the target stopping position $s_y$ is, in contrast:

$$hf_y = \frac{d_y}{2} + D * g_h = \frac{d_y}{2} + e_h \qquad \text{Formula 7}$$

If the immediate position of the vehicle LB can be ascertained via satellite locating (GPS), the measurement deviation e is set back to zero. The accuracy of this measurement lies in the range u of several meters. This range u is to be taken into consideration when determining capture range f:

The capture range $vf_y$ before the target stopping position $s_y$ is thus:

$$vf_y = \frac{u}{2} + \frac{d_y}{2} + D * g_v = \frac{d_y}{2} + e_v \qquad \text{Formula 6a}$$

The capture range $hf_y$ after the target stopping position $s_y$ is, in contrast:

$$hf_y = \frac{u}{2} + \frac{d_y}{2} + D * g_h = \frac{d_y}{2} + e_h \qquad \text{Formula 7a}$$

D is thereby the distance between the beacon or the place at which the satellite locating occurs and that of the stopping range d or the target stopping position $s_y$ of the bus stop H, for which the capture range f was determined.

The accuracy of the correction to measured value w is primarily dependent on the size of the stopping range d. The stopping range d should therefore be as small as possible versus the length of bus stop H. This is possible if the length of the vehicle LB is known. The stopping range d thus corresponds to the difference between the length of bus stop H and the length of the vehicle LB. The vehicle length can thereby be taken into consideration individually.

Figure 6:
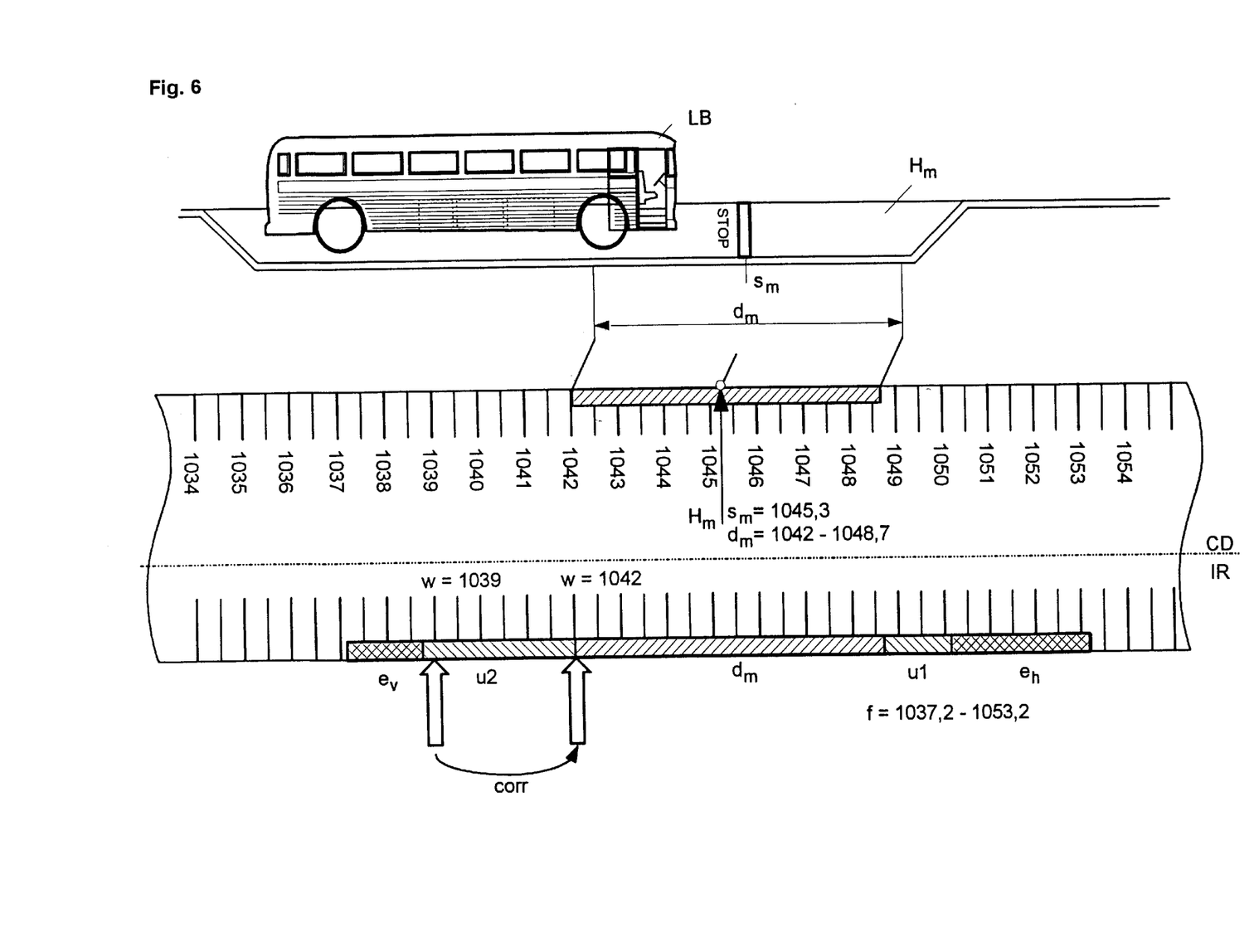

FIG. 6 displays the correction to measured value w at a bus stop $H_m$ in accordance with the invention. The target stopping position $s_m$ and the stopping range $d_m$ are measured and drawn in, and their data is stored in memory medium CD. The target stopping position $s_m$ is at 1,045.3 m. The stopping range $d_m$ begins at 1,042 m and ends at 1,048.7 m. These data from bus stop $H_m$ can be called up from memory storage CD in the vehicle LB by the computer IR. The stored data should correlate as well as possible with the actual conditions. Due to measurement deviations and structural changes in the road, deviations can indeed occur in practical operation. By means of the data given to memory medium CD about the bus stop $H_m$, the errors u1 and u2 which may have been taken over from previous bus stop H as well as measurement deviations $e_v$ and $e_h$, the computer IR determines the capture range f for the bus stop $H_m$, which lies between the limit values 1,037 m and 1,053 m. When the vehicle stops and preferably, when the doors are released in addition, the computer IR determines that the measured value w which has been collected lies at 1,039 m and is thus within the capture range $f_m$, but outside of stopping range $d_m$. The computer IR thus corrects the measured value w and sets the counter of the measuring device to the end of stopping range $d_m$ or at the level 1,042 m.

Instead of stopping range $d_m$ (for example beginning at 1,042 m and ending at 1,048.7 m), the length of the bus stop (for example beginning at 1,035 m and ending at 1,050 m) could be stored in memory. The vehicle computer IR could thereby calculate the stopping range $d_m$ from the difference between these two lengths.

In addition, a target stopping position s as well as the corresponding length of the stopping range d (for example 6 m) or the bus stop length (for example 15 m) and the length of the vehicle (for example 9 m) could also be stored. In this way, the corner points of the stopping range d can each be precisely determined (for example, it is decided that the target stopping position s always lies in the middle or at the end of the stopping range).

By the method in accordance with the invention, other means for correcting the measured value w can of course also be used, if the vehicle LB stops within the capture range. It is essential that the correction occurs in the direction toward target stopping range s. If target stopping positions s are stored, a correction can also take place when the measured value w lies within the stopping range d.

For various vehicles LB and/or various road segments, correspondingly adapted accuracy factors g or $g_v$ and $g_h$ can also be determined.

The computer IR preferably determines in addition whether capture ranges f are overlapped by two bus stops H. In case of a bus stopping, possibly also a door-releasing, in the overlap of both capture ranges $f_n$ and $f_{n+1}$, this will be announced to the driver, so that a manual correction can be performed.

When there are numerous stops within a stopping range d of a bus stop H, the maximum possible measurement deviation u2 and in special cases also the measurement deviation u1 can be reduced. If the vehicle stops, as shown in FIG. 5, at the bus stop $H_{n+1}$ and if the measured value w lies within the stopping range d, no correction of value w occurs. The exact position of the vehicle within stopping range d is, however, unknown. The exact position of the vehicle can deviate from the measured value w by the possible measurement deviations u1 and u2. The possible measurement deviation u1 corresponds to the difference of the measured value w and the value of the starting point of stopping range d. The possible measurement deviation u2 corresponds to the difference of the measured value w and the value of the ending point of stopping range d. With every forward movement of the vehicle, the possible measurement deviation u2 is reduced by the additional distance covered. If the measured value w exceeds the value of the ending point of stopping range d when the bus drives forward within the stopping range d, the possible measurement deviation u1 is reduced accordingly. If at the first stop a possible measurement deviation u1 of, for example, 3.5 m is determined and, as the bus drives forward up to the next stop, the measured value w has exceeded the value of the ending point of stopping range d by 3.5 meters, the possible measurement deviation u2 is reduced to zero. The vehicle is thus exactly on the ending point of stopping range d. As soon as it has exceeded the value of the ending point of stopping range d, value w will always be set back to the value of the ending point of stopping range d. The possible measurement deviation u2 already reaches the value zero when the measured value w reaches the value of the ending point of stopping range d. Thus the measurement deviations u1, u2 can be reduced by the vehicle driving forward within the stopping range d, so that the capture range f for the next bus stop is reduced accordingly.

We claim:

1. Method for continuously locating vehicles, the vehicles including a computer connected to a path data measuring unit that emits a measured value corresponding to a traveled distance and further connected to a path data memory, in which the route to be traveled, the position of bus stops, and the distances between stops are stored, the method comprising:

assigning stopping ranges for the bus stops, wherein the stopping ranges are one of stored in the path data memory and determined from additionally stored data related to the bus stops including target stopping positions and the lengths of bus stops;

positioning the vehicle within a first stopping range of a first bus stop, measuring, with the path data measuring unit, a distance from the vehicle within the first stopping range to the first bus stop;

determining a capture range ($f_y$) for a subsequent bus stop by adding the stopping ranges for one of the first and a preceding bus stop ($d_x$) and for the subsequent bus stop ($d_y$) to a measuring deviation (e), which is determined by multiplying a distance (D) between the first and subsequent bus stops by at least one accuracy factor (g) corresponding to the path data measurement:

$$f_y = d_x + d_y + D * g = d_x + d_y + e;$$

measuring a distance from the vehicle to the subsequent bus stop, wherein, if the measured distance to the subsequent bus stop lies within the determined capture range, the computer determines that the bus stop was reached. and the measurement deviation is set back to zero, and wherein, if the measured distance to the subsequent bus stop lies outside of the determined capture range for the subsequent bus stop, then the measured value is corrected in a direction of the second stopping range.

2. The method in accordance with claim 1, further comprising:

dividing the determined capture range ($f_y$) into a first capture range ($vf_y$), positioned before a target stopping position ($s_y$), and a second capture range ($hf_y$), positioned after the target stopping range ($s_y$), associating an accuracy factor ($g_v$, $g_h$) to the capture ranges ($vf_y$, $hf_y$);

determining, from one of the first bus stop and a previous bus stop, a maximum possible measurement deviation (u2, u1) to the capture ranges ($vf_y$, $hf_y$), which correspond to portions of the stopping range of the one of the first bus stop and the previous bus stop, which were divided by the measured value:

$$d_x = u1_x + u2_x;$$

$$vf_y = u2_x + \frac{d_y}{2} + D * g_v = u2_x + \frac{d_y}{2} + e_v;$$

$$hf_y = u1_x + \frac{d_y}{2} + D * g_h = u1_x + \frac{d_y}{2} + e_h.$$

3. The method in accordance with claim 2, wherein various accuracy factors values g or $g_v$ and $g_h$ are used for at least one of various vehicles and route ranges.

4. The method in accordance with claim 2, wherein when passing a beacon, the measurement deviation e, $e_v$, $e_h$ and the maximum possible measurement deviation u or u2 and u1 are set to zero, and the method further comprises:

measuring a distance $D_b$ from the beacon; and determining the capture range $f_y$ of a next bus stop ($H_y$) with the following:

$$vf_y = \frac{d_y}{2} + D_b * g_v = \frac{d_y}{2} + e_v;$$

$$hf_y = \frac{d_y}{2} + D_b * g_h = \frac{d_y}{2} + e_h.$$

5. The method in accordance with claim 2, wherein when determining a position of the vehicle via satellite, the measurement deviation e, $e_v$, $e_h$ are set to zero, and the method further comprises:

measuring a distance $D_s$ from the place at which the satellite locating occurs; and determining the capture range $f_y$ of a next bus stop ($H_y$) with the following:

$$vf_y = \frac{u}{2} + \frac{d_y}{2} + D_s * g_v = \frac{d_y}{2} + e_v;$$

$$hf_y = \frac{u}{2} + \frac{d_y}{2} + D_s * g_h = \frac{d_y}{2} + e_h;$$

wherein u represents a measurement deviation.

6. The method in accordance with claim 1, the method further comprising at least one of:

setting the measured value to one of a nearer limiting value of stopping range $d_y$ if the measured value lies outside of the stopping range $d_y$; and adjusting the measured value to the target stopping position $s_y$ if the measured value lies within the stopping range $d_y$ as determined by a difference between the measured value and a position of a target stopping position $s_y$.

7. The method in accordance with claim 1, wherein the measured value correction is performed for each stop within the capture range f of a bus stop (H).

8. The method in accordance with claim 1, wherein the measured value correction is not completed until after a vehicle door has been released.

9. The method in accordance with claim 1, wherein capture ranges fare established for further points along the route at which at least one of information is to be given to passengers, control signals are to be given to traffic lights, and activities are to be triggered.

10. The method in accordance with claim 1, wherein the stopping range d is determined by at least one of the stored target stopping range s, the length of the bus stop and the length of the vehicle.

11. The method in accordance with claim 1, further comprising:

determining with the computer whether the capture ranges f are overlapped by two bus stops (H); and advising a vehicle operator to perform a manual correction if the stopping of the bus occurs within the overlap of both capture ranges f.

12. The method in accordance with claim 1, wherein when driving forward within the stopping range d of a bus stop (H), a measurement deviation u2 is reduced, and wherein when the measured distance to the subsequent bus stop exceeds the value of the ending point of the stopping range, a measurement deviation u1 corresponding to the distance driven forward is reduced.

13. A device for continuously locating vehicles, the vehicles including a computer connected to a path data measuring unit that emits a measured value corresponding to a traveled distance and further connected to a path data memory, in which the route to be traveled, the position of bus stops, and the distances between stops are stored, the device comprising:

bus stops are assigned with stopping ranges d which are one of stored in the path data memory and calculatable by additionally stored data associated with the bus stops including target stopping positions and the lengths of bus stops;

the path data measurement unit adapted to measure a distance, within a first stopping range, from the vehicle to a first bus stop;

the computer is designed to determine a capture range ($f_y$) for a subsequent bus stop by adding the one of the stored and calculatable stopping ranges for one of the first and a preceding bus stop ($d_x$) and for the subsequent bus stop ($d_y$) to a measuring deviation (e), which is determined by multiplying a distance (D) between the first and subsequent bus stops by at least one accuracy factor (g) corresponding to the path data measurement:

$$f_y = d_x + d_y + {}^*g = d_x + d_y + e;$$

the path data measurement unit adapted to measure a distance from the vehicle to a subsequent bus stop;

wherein, if the measured distance to the subsequent bus stop lies within the determined capture range, the computer determines that the bus stop was reached, and the measurement deviation is set back to zero, and wherein, if the measured distance to the subsequent bus stop lies outside of the determined capture range for the subsequent bus stop, then the measured value is corrected in a direction of the second stopping range.

* * * * *